United States Patent [19]
Stegmaier

[11] Patent Number: 5,902,611
[45] Date of Patent: May 11, 1999

[54] INJECTION MOLDING MACHINE AND METHOD WITH INTEGRATED CARRIAGE ASSEMBLY

[75] Inventor: Truman J. Stegmaier, Marshfield, Mo.

[73] Assignee: Vertech Systems, LLC, Houston, Tex.

[21] Appl. No.: 09/095,280

[22] Filed: Jun. 10, 1998

Related U.S. Application Data

[60] Provisional application No. 60/049,976, Jun. 11, 1997.
[51] Int. Cl.⁶ .................................................. B29C 45/77
[52] U.S. Cl. .......................... 425/145; 425/574; 425/575; 425/589
[58] Field of Search ..................................... 425/589, 590, 425/145, 450.1, 451, 574, 575

[56] References Cited

U.S. PATENT DOCUMENTS

| | | |
|---|---|---|
| 2,259,781 | 10/1941 | Shaw et al. . |
| 3,806,294 | 4/1974 | Hehl ........................................ 425/589 |
| 3,822,975 | 7/1974 | Hehl ........................................ 425/589 |
| 3,936,259 | 2/1976 | Hofer et al. .............................. 425/589 |
| 4,925,618 | 5/1990 | Takada ..................................... 425/590 |
| 5,620,723 | 4/1997 | Glaesener et al. ....................... 425/589 |
| 5,630,977 | 5/1997 | Catalanotti et al. ..................... 264/318 |

*Primary Examiner*—Tim Heitbrink
*Attorney, Agent, or Firm*—Hardy & Bacon

[57] ABSTRACT

This invention relates to injection molding machines and, more particularly, to an injection molding machine having an integrated carriage assembly for injection of a material into a mold. The carriage assembly includes an integral injection cylinder and carriage cylinder housing having an outer injection cylindrical wall and a pair of outer carriage cylindrical walls. An injection cylinder assembly is connected to the outer injection cylindrical wall forming a hydraulic chamber, and a motor is mounted on the carriage assembly to form a combined rotary reciprocating hydraulic cylinder. The outer carriage cylindrical walls receive transport rails to form hydraulic carriage cylinders to move the carriage assembly. The mold material density, temperature, pressure, and flow rate are closely controlled by axially controlling the force applied to the injection screw with the combined rotary reciprocating hydraulic cylinder.

9 Claims, 6 Drawing Sheets

INJECTION MOLDING MACHINE AND METHOD WITH INTEGRATED CARRIAGE ASSEMBLY

This application claims the benefit of U.S. Provisional Application 60/049,976, filed Jun. 11, 1997.

BACKGROUND OF THE INVENTION

Injection molding is a commonly used and versatile process for molding many materials including thermoplastics and thermosets into diverse shapes. Recent injection molding machines utilize a rotary reciprocating screw or auger. As material is introduced into an injection cavity of a barrel by rotation of the screw, pressure builds up inside the injection cavity causing the screw, while rotating, to move away from the mold. When a desired amount of material is in the injection cavity, the rotation of the screw is stopped, and a hydraulic cylinder is activated to push the screw toward the mold; so that the screw functions as a ram forcing material into the mold. In this assembly, a first hydraulic cylinder is used to push the screw forward to inject the material, and a second cylinder is used to hold the barrel in engagement with the mold. Significantly, both of the first and second cylinders are independent of the other components of the injection molding machine and of each other. Further, the cylinders operate indirectly on the components, such as the screw, of the injection molding machine. Therefore, the injection molding machines are undesirably complex having numerous components leading to higher cost, reduced efficiency, reduced reliability, and increased maintenance.

To obtain the highest quality injection molded parts, it is important to control the temperature and density of the material, the pressure in the injection cavity, and the flow rate of the material out of the injection cavity into the mold. Unfortunately, control of these parameters has been limited. Specifically, the indirect relationship between the independent cylinders and the screw precludes high tolerance control of these parameters thereby limiting the quality and consistency of injection molded parts.

Thus, reduction in the complexity of injection molding machines is desirable to reduce the number of parts used in injection molding machines thereby simplifying and reducing the cost of injection molding machines, increasing the reliability and efficiency of injection molding machines, and reducing maintenance on injection molding machines. It is also desirable to more closely control the parameters of mold material temperature, density, pressure, and flow rate to enhance the quality and consistency of injection molded parts. It is further desirable to substantially reduce the time required to change an injection mold and set a machine for a different part size thereby reducing the need for additional injection molding machines and the cost of producing injection molded parts.

BRIEF SUMMARY OF THE INVENTION

There is, therefore, provided in one embodiment of this invention a novel screw-drive assembly for use in an injection molding machine, having a reciprocating rotary hydraulic screw drive. Accordingly, it is an object of the present invention to provide an improved injection molding machine with a hydraulic cylinder including an inner spindle guide sleeve and a cylinder wall containing a spindle and rotating quill. By maintaining the moving components on a precise center-line, precise force alignment between the injection screw and barrel assembly is achieved, thus increasing the quality and consistency of the injection molded parts and reducing wear on the screw and barrel.

BRIEF DESCRIPTION OF THE DRAWINGS

These and other features, advantages, and objects will appear from the following Detailed Description when considered in connection with the accompanying drawings in which similar reference characters denote similar elements throughout the several views and wherein.

DETAILED DESCRIPTION

Figure 1:
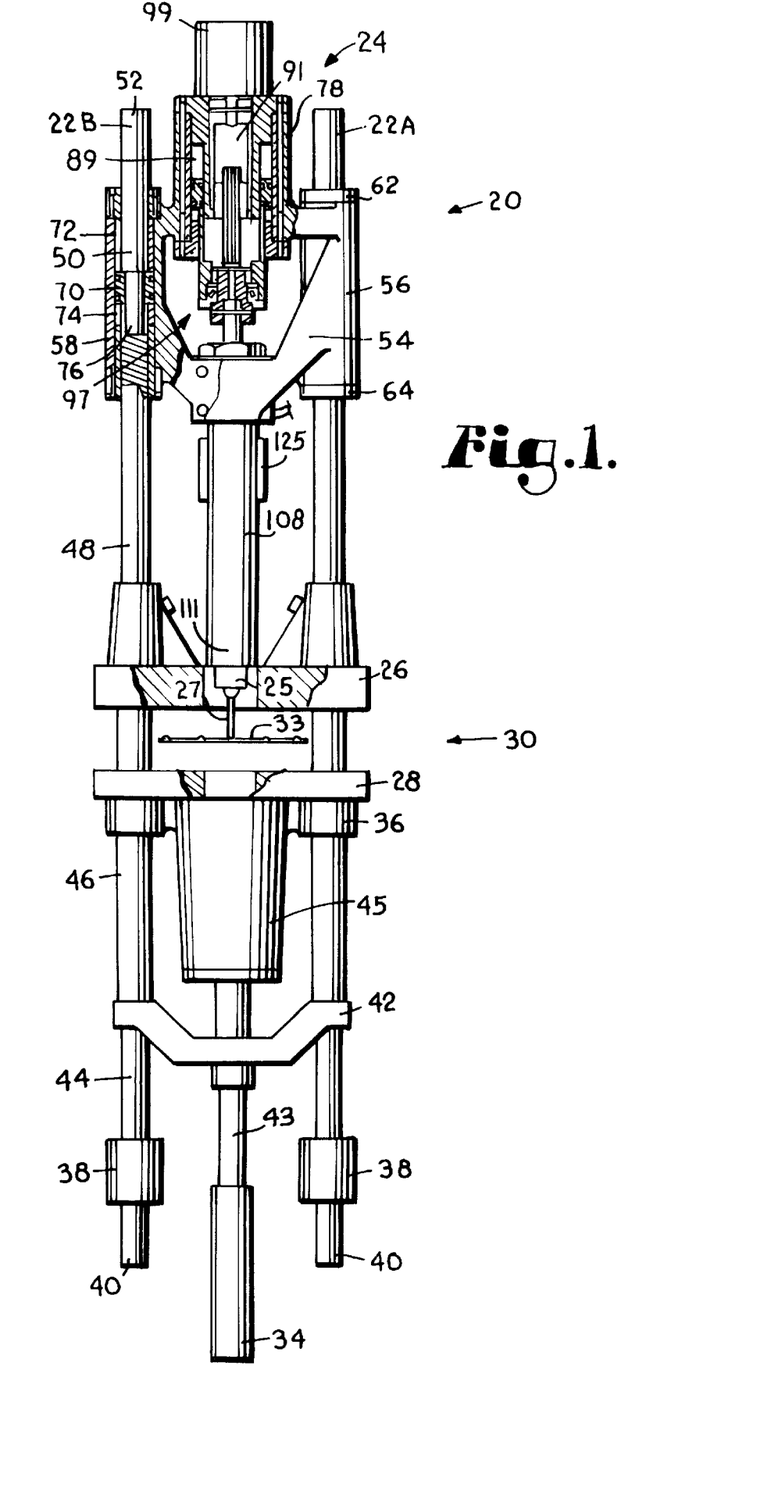
FIG. 1 is a front elevational view in partial cross section of an injection molding machine according to the present invention.

Referring to the drawings in greater detail, FIG. 1 shows an injection molding machine having a carriage assembly, generally designated 20 which includes an injection cylinder assembly, generally designated 24, that can be described as a combined reciprocating rotary hydraulic screw-drive assembly. The carriage assembly is slidably mounted on a pair of transport rails 22A, 22B extending downwardly from the carriage assembly 20 into an upper clamp plate 26 and through a stationary lower clamp plate 28. A mold, generally designated 30, has an upper mold half 31 and a lower mold half or slide 32 defining an internal mold cavity 33 of desired shape. The mold 30 is positioned between the upper and lower clamp plates 26, 28. When a stationary quick clamp cylinder 34 is actuated, the clamp plates 26, 28 are brought together to clamp the mold 30 together. With the mold 30 clamped in place, the injection cylinder assembly 24 is operated to inject a shot of mold material through a nozzle 25 and sprue 27 into the mold. After injection, the newly formed part is removed from the mold 30, and the mold 30 is repositioned for another injection. In the alternative, the mold 30 is quickly changed for injection molding of a different part.

The transport rails 22 and the surrounding assemblies are preferably identical, and thus, the identical features will be identified by identical reference numerals. The transport rails 22 are slidably held in a pair of stationary upper stabilization bearings 36 and in a pair of stationary lower stabilization bearings 38. The upper bearings are located just below and attached to the lower clamp plate 28, and the lower stabilization bearings 38 are positioned near the bottom ends 40 of the transport rails 22. The combination of the upper bearings 36 and the lower bearings 38 stabilizes the transport rails 22, so the carriage assembly 20 and upper clamp plate 26 move consistently and with great stability. Further stability is added to the transport rails 22 and the carriage assembly 20 by a yoke 42 which couples the two transport rails together near the bottom ends 40. The yoke 42 is fixably attached to the transport rails 22 and to a piston 43 of the quick clamp cylinder 34, so that movement of the piston 43 imparts such movement to the transport rails 22. A high pressure clamping cylinder 45 is mounted on the bottom of the lower clamp plate 28 between the upper bearings 36. The piston 43 is common or coaxial to both of the clamping cylinders 34, 45.

The transport rails 22 are preferably formed in four (4) sections. The first and lowest sections 44 extend from the bottom ends 40 to the yoke 42; the second sections 46 extend from the yoke 42 to the upper clamp plate 26; the third sections 48 extend from the upper clamp plate 26 to the carriage assembly 20, and the fourth and highest sections 50 extend from the carriage assembly to the top ends 52 of the transport rails 22. The connections between the sections of the transports rails are preferably threaded connections 76. As desired, the sections may thread directly together or into a joining component such as the yoke 42 or upper clamp plate 26. Sectioning the transport rails allows the different sections to have different diameters or be made from different materials. Of the four (4) sections, the first section 44 has the smallest diameter.

Figure 2:
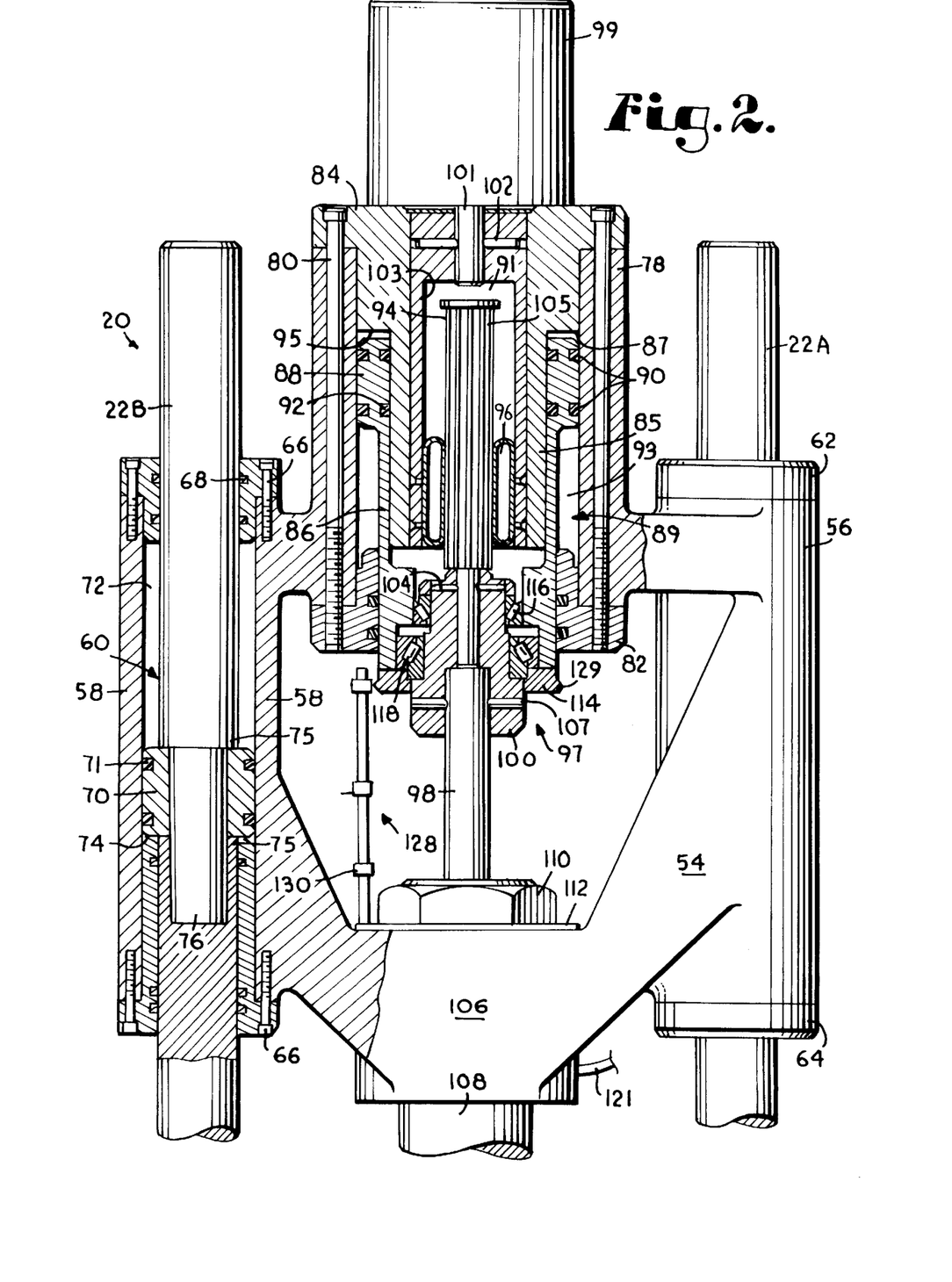
FIG. 2 is a partial cross sectional view of a carriage assembly of the injection molding machine of FIG. 1 illustrating a piston assembly of the carriage assembly in a retracted position.
Figure 3:
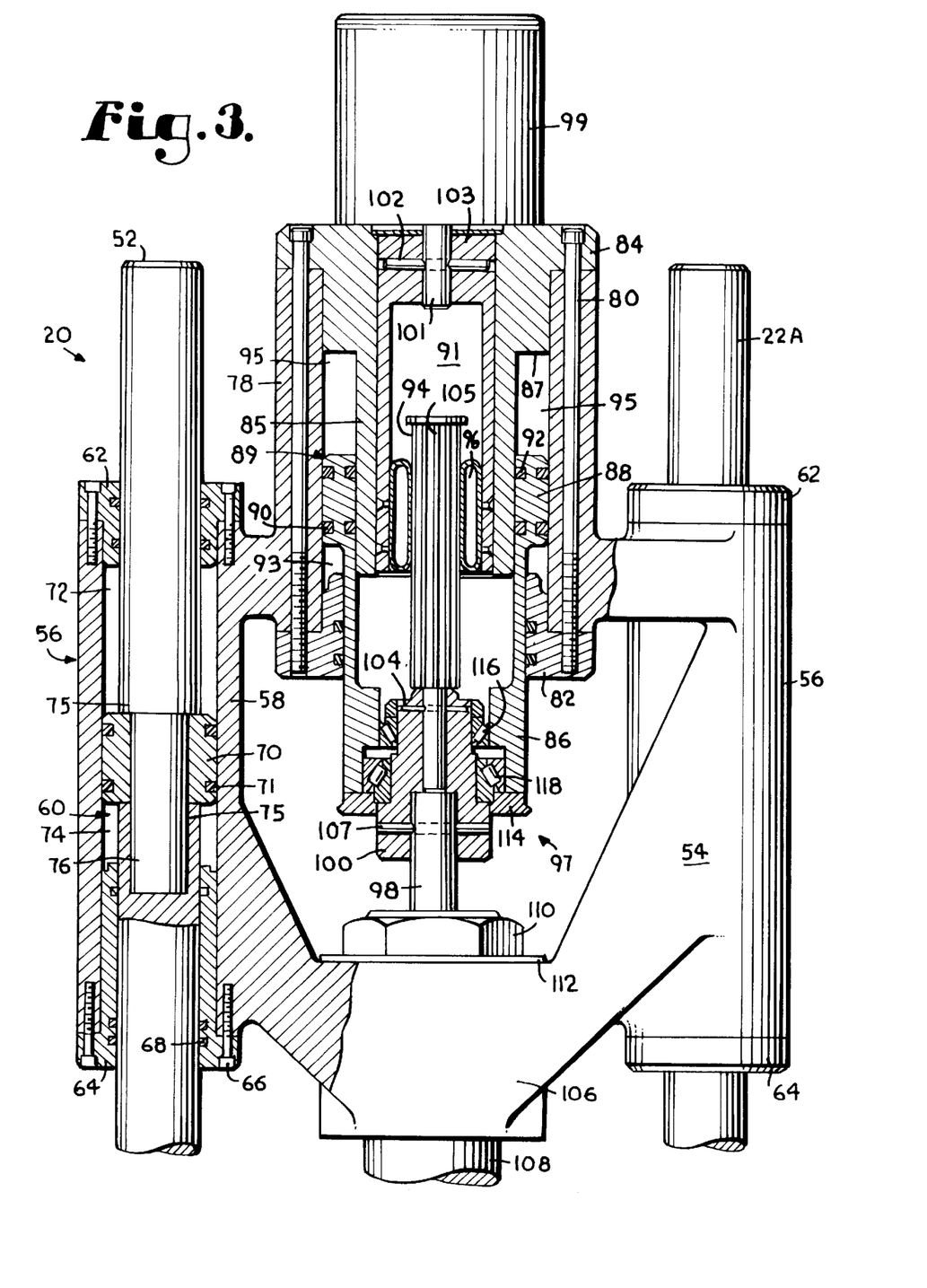
FIG. 3 is a partial cross sectional view of the carriage assembly of FIG. 2 illustrating the piston assembly in a partially extended position.

Referring to FIGS. 2 and 3, the carriage assembly 20 is slidably mounted on the transport rails 22 by an integral injection cylinder and carriage cylinder housing 54. The integral housing 54 has a pair of carriage cylinders 56 formed by outer cylindrical carriage walls 58 which define internal hydraulic chambers 60. The chambers are closed at their ends by upper carriage cylinder end caps 62 and lower carriage cylinder end caps 64. The end caps 62, 64 are connected to the outer carriage wall with fasteners such as bolts 66. The transport rails 22 pass centrally through the internal hydraulic chambers 60 and the end caps 62, 64. The end caps are preferably provided with seals 68 to seal the hydraulic chamber 60. Stationary carriage pistons 70, with seals 71 thereon, are immovably fixed to the transport rails 22 inside the hydraulic chambers 60 and separate the chambers 60 into top carriage raising chambers 72 and bottom carriage lowering chambers 74. In the preferred embodiment shown, the carriage pistons 70 are held stationary relative to the transport rails 22 by shoulders 75 of the third sections 48 and the fourth sections 50 of the transport rails 22. The third and fourth sections are connected with the threaded connection 76, and they could also be threaded into the carriage pistons 70. When hydraulic pressure is applied in the lowering chambers 74, the carriage assembly 20 is forced downwardly to the transport rails 22, and when hydraulic pressure is applied in the raising chambers 72, the carriage assembly 20 is forced upwardly relative to the transport rails 22. Thus, the carriage cylinders 56 provide a means for transporting the carriage assembly 20.

The integral housing 54 also has an outer cylindrical injection cylinder wall 78. The injection cylinder assembly 24 is connected to the injection cylinder wall with fasteners such as bolts 80 which extend through a motor mount 84, the injection cylinder wall 78, and thread into an injection cylinder end cap 82. The ends of the injection cylinder wall are closed by the injection cylinder end cap 82 and the motor mount 84. The motor mount 84 also comprises an inner spindle guide sleeve 85 which extends from a motor mount shoulder 87 parallel to the injection cylinder wall 78. The motor mount shoulder 87, cylinder wall 78, inner spindle guide sleeve 85, and end cap 82 define an annular injection cylinder hydraulic chamber 89.

An injection piston 86 with an upper annular ring 88 is slidably received in the injection cylinder hydraulic chamber 89. The injection spindle 86 has outer seals 90 and inner seals 92 which seal against the injection cylinder outer wall 78 and the inner spindle guide sleeve 85 respectively to separate the injection cylinder hydraulic chamber 89 into a lower retraction side hydraulic chamber 93 and an upper injection side hydraulic chamber 95. When hydraulic pressure is introduced into the retraction side chamber 93 the injection spindle 86 and the other components of the rotating quill assembly, generally designated 97, are moved axially away from the mold. When hydraulic pressure, controlled by a servo valve 109 (FIG. 4), is introduced into the injection side chamber 95 the injection spindle 86 and the other components of the injection piston assembly 97 are moved axially toward the mold. With the exception of the injection spindle 86, the components of the rotating quill assembly 97 rotate and thus comprise a rotary piston assembly which is a subassembly of the rotating quill assembly 97.

A hydraulic motor 99 is mounted on top of the motor mount 84 and has a motor shaft 101 extending into a central opening 91 in the injection cylinder assembly 24. The motor shaft 101 is rotationally connected to a motor-spline coupling shaft 103 by a pin connection 102. The coupling shaft 103 rotates inside the inner spindle guide sleeve 85 and is rotationally coupled to the rotary piston assembly. Specifically, the coupling shaft 103 is coupled to a roller spline 94 with a roller bearing spline 96. The roller bearing spline 96 engages the splines 105 of the roller spline 94, so that the coupling shaft 103 and roller spline 94 rotate together. However the roller bearing spline 96 permits axial movement of the roller spline 94 relative to the coupling shaft 103. The roller spline 94 is joined to an axially reciprocating rotary injection screw 98 by a spline-screw collar 100. Pin connections 104 and 107 connect the roller spline 94 to the collar 100 and the collar 100 to the injection screw 98, respectively. Thus, the injection cylinder assembly provides a combined rotary reciprocating hydraulic cylinder.

As stated, the injection spindle 86 and additionally an attached injection piston end cap 114 of the piston assembly do not rotate. The injection spindle 86 and its end cap 114 are separated from the rotary piston subassembly by an upper thrust bearing 116 and a lower thrust bearing 118 allowing relative rotation between the injection spindle 86 and the rotary portion of the rotating quill assembly 97.

Figure 4:
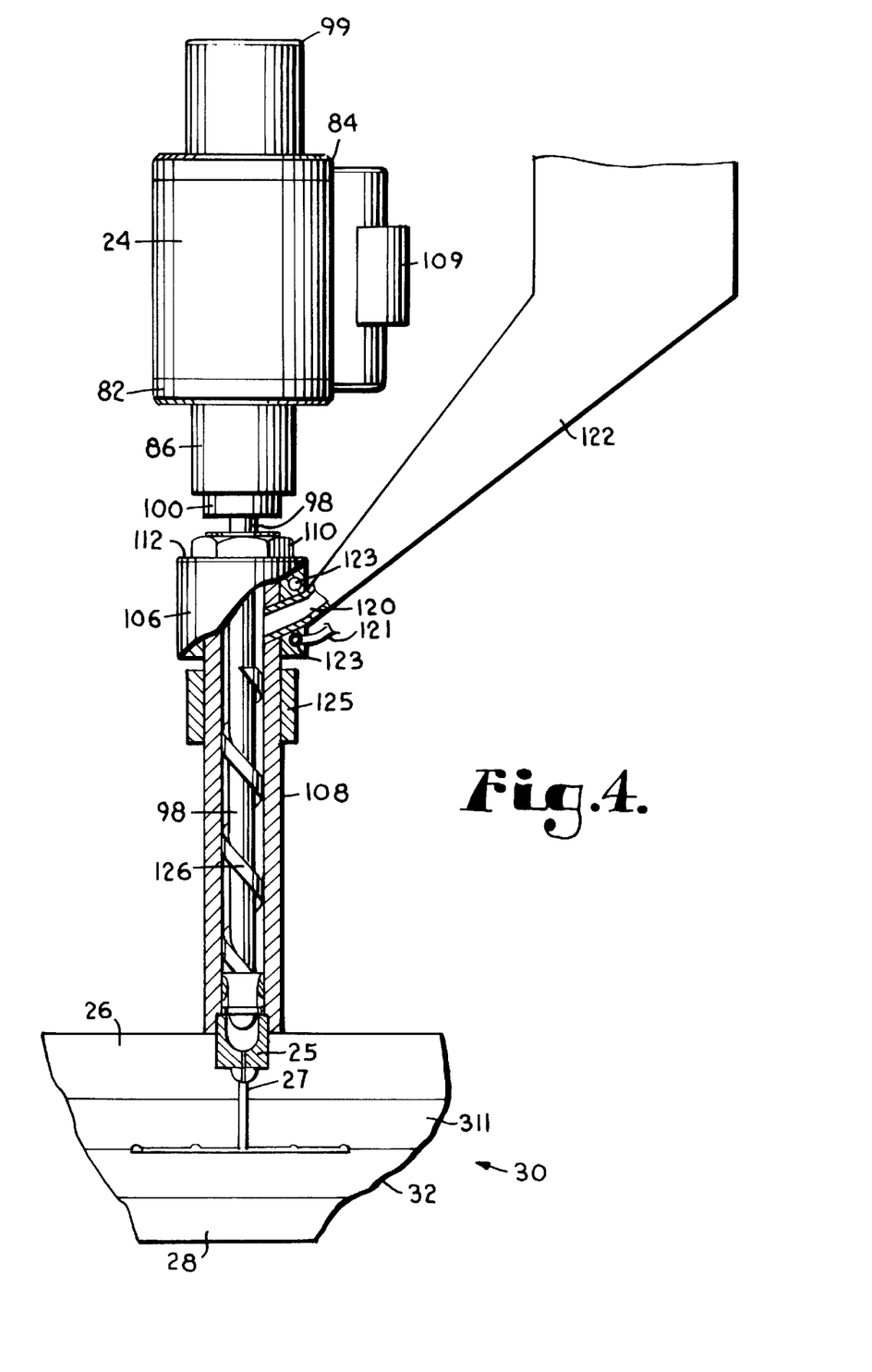
FIG. 4 is a fragmentary, partial cross sectional, and partially schematic view of the injection molding machine of FIG. 1 illustrating an injection screw of the machine.

Referring additionally to FIG. 4, the injection screw 98 extends through a throat 106 of the integral housing 54 into a barrel 108 which is held to the throat 106 by a barrel nut 110 and barrel washer 112. The barrel 108 extends down from the throat 106 to the mold 30 and defines an internal injection cavity 124 at its discharge end 111 which is adjacent the nozzle 25 and the mold 30. The throat 106 has an opening 120 in its side wall in communication with a hopper 122 which supplies mold material to the injection cavity 124. The injection screw has a helical tooth 126 which begins inside the barrel 108 and ends at a valve assembly 127. As the injection screw 98 is rotated by the motor 99, material is fed to the injection screw 98 from the hopper 122. As the injection cavity 124 fills with material, the injection screw 98 is backed away from the mold 30. The slot size, which is typically less than 5 ounces, is determined by how far back the injection screw is allowed to move.

The barrel 108 is surrounded by at least one heating element 125 providing a means for heating the material in the barrel 108. Preferably, six (6) heating elements are used. The throat 106 of the integral housing 54 is provided with cooling means comprising a cooling tunnel 123, and a coolant supply line 121. The coolant supply line 121 provides a coolant, preferably cooled water, to the cooling tunnel 123. Because of the cooled throat 106, the material in the hopper 122 is maintained in a solid state and the integral housing 54 and other components of the machine are not exposed to potentially damaging heat from the heated barrel 108.

Referring specifically to FIG. 2, a proximity sensor array, generally designated 128, is utilized to control the axial movement of the rotating quill assembly 97. A component of the sensor array, preferably a sensor 129, is placed on a component of the rotating quill assembly 97, preferably the end cap 114, and three switches are adjustably mounted to a component of the carriage assembly 20 that is fixed relative to the rotating quill assembly 97. Preferably, the switches are mounted on the integral housing 54 around the barrel nut 110 and include, a shot size switch 132 spaced a selected distance away from the barrel nut. When the sensor reaches the shot size switch, injection screw rotation is stopped and a timer causes the screw to retract a short distance for decompression of the melt. Each of the switches can be moved to adjust the various stroke lengths.

Referring again briefly to FIG. 1, the mold 30 typically includes at least two parts, the upper half 31 mounted in the upper clamp plate 26 and the lower half/slide 32 slidable over the lower clamp plate 28. For purposes of the quick change feature of the mold 30, the two halves of the mold are identical, and thus, they will be described by reference to only one of the mold halves.

Figure 5:
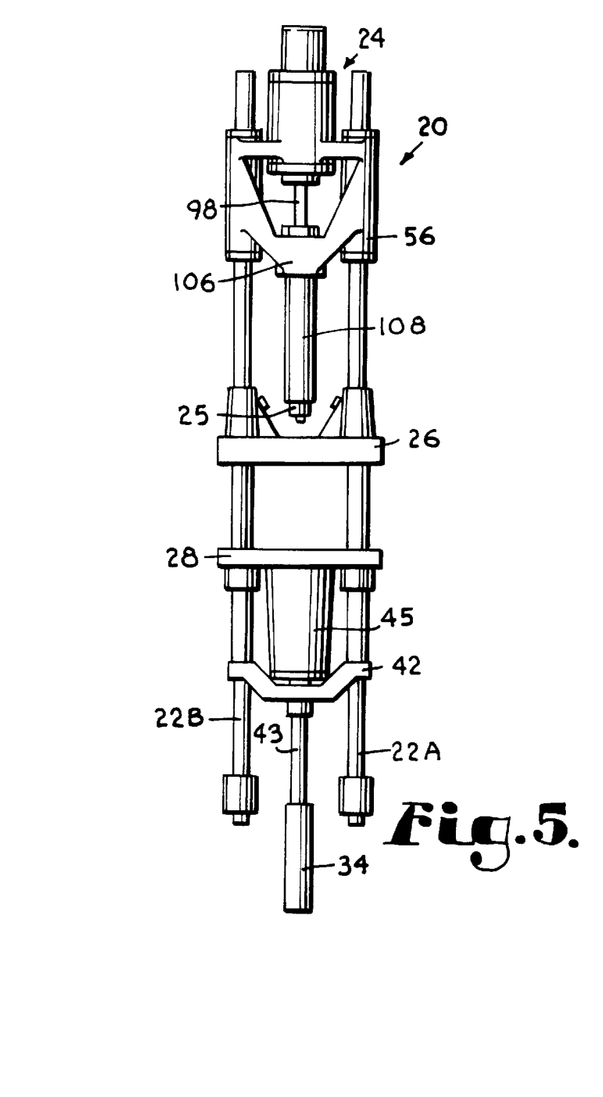
FIG. 5 is a front elevational view of the injection molding machine of FIG. 1 in a carriage up purge position and having the mold assembly removed.
Figures 6, 7:
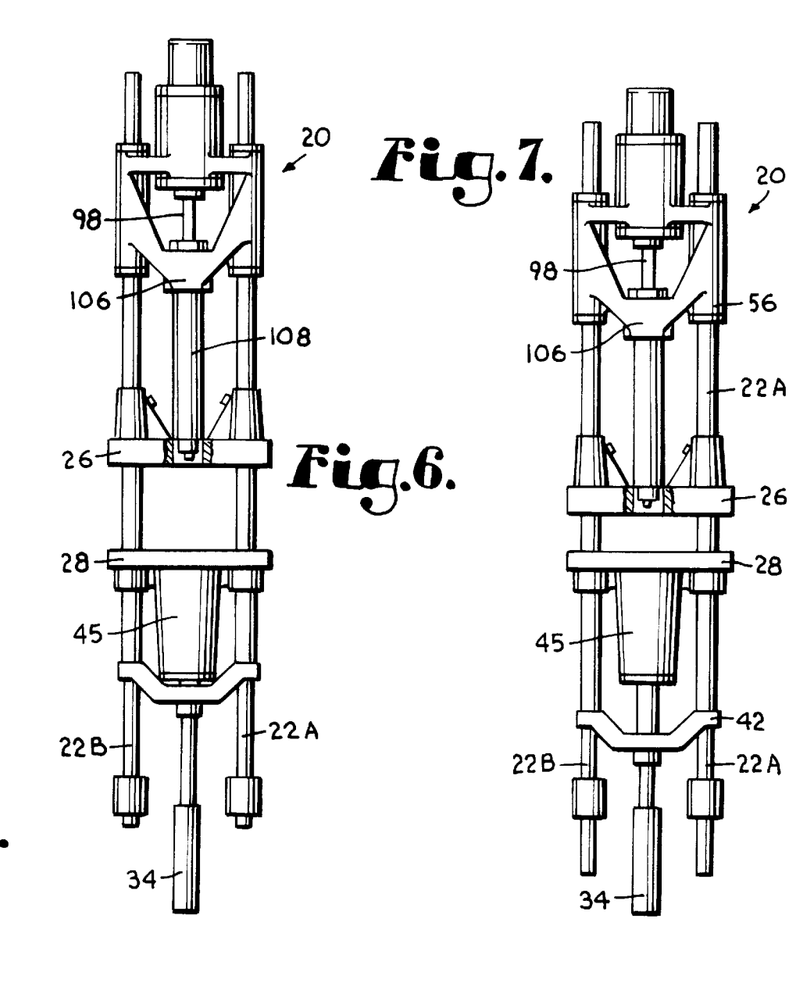
FIG. 6 is a front elevational view of the injection molding machine of FIG. 1 in a carriage down, clamp open position and having the mold assembly removed.
FIG. 7 is a front elevational view of the injection molding machine of FIG. 1 in a clamped position and having the mold assembly removed.
Figure 8:
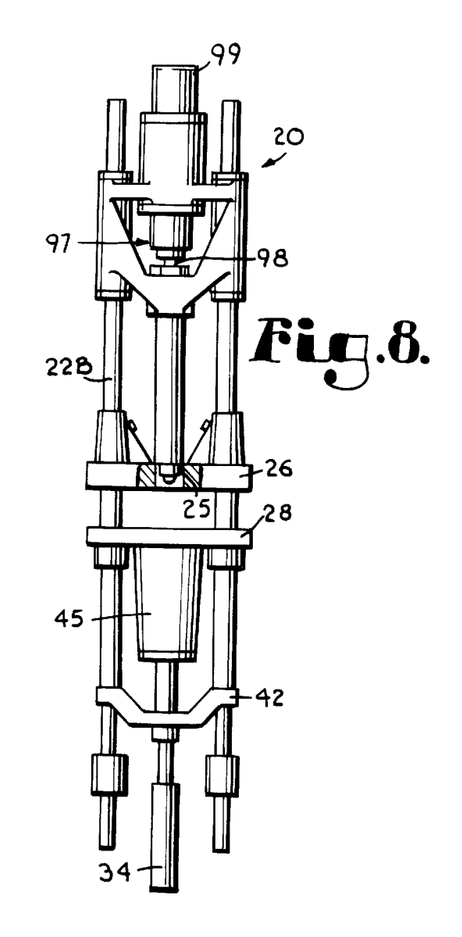
FIG. 8 is a front elevational view of the injection molding machine of FIG. 1 in an injection cylinder down position and having the mold assembly removed.

The explanation of the operation of the injection molding machine shown in FIGS. 5 through 10 is given with reference to FIGS. 2 and 4 and begins with a completely new cycle and the machine in a purging position as illustrated in FIG. 5. In this position, the piston 43 of the quick clamp cylinder 34 is extended and low pressure is applied to the top carriage raising chambers 72 of the carriage cylinders 56 to fully raise the carriage assembly 20, so that the nozzle 25 and barrel 108 are unseated from the upper clamp plate 26. In this position the barrel can be purged to change the type or color of plastic or to clean the barrel for a new production run. After purging, which includes filling the barrel 108 and positioning the injection screw 98 for injection, low pressure is removed from the top raising chambers 72 and applied to the bottom carriage lowering chambers 74. This operation lowers the carriage assembly such that the barrel and nozzle are seated in the upper clamp plate 26 as shown in FIG. 6.

With the barrel seated, the mold is then slid into place, and the quick clamp 34 is actuated to lower the yoke, transport rails, carriage assembly and upper clamp plate thereby clamping the mold. As the carriage assembly 20 and upper clamp plate 26 are moving down, a low hydraulic pressure is applied to the high pressure clamp cylinder 45. The high pressure clamp cylinder, because of the amount of oil being moved, slows the progression of the upper plate toward the lower plate, and thus, when the plates meet, there is gentle contact. Once mold closure is verified with a microswitch (not shown), high pressure is applied to both the bottom lowering carriage chambers 74 and the high pressure clamp cylinder 45 as illustrated in FIG. 7 Because of the symmetry of the carriage cylinders, the centrality of the high pressure, and the fact that the force from the hydraulic pressure is directed axially down the transport rails 22, no moments are created in the injection molding machine.

With the mold securely clamped, hydraulic pressure is applied to the injection side 95 of the injection hydraulic chamber thereby applying an axial force to the rotating quill assembly 97, avoiding the creation of moments. The axial force pushes the injection screw 98 toward the mold until the timers reach zero or the screw hits bottom thus injecting material through the nozzle 25 into the mold 30. Then the piston assembly is in the position shown in FIG. 8.

While the material cools in the mold, the injection screw 98 is rotated by the motor 99. While rotating, the injection screw acts as a feed auger receiving material from the hopper 122 and pressurizing the material in the injection cavity 124. As the injection cavity is filled, the injection screw is forced away from the mold until the sensor 129 reaches the shot size switch 132. As the injection cavity is filled, the pressure in the injection 95 and retraction 93 side hydraulic chambers is monitored and controlled by servo valve 109. The servo valve is controlled by electrical signals received form electrical connection 136 and receives hydraulic fluid from a hydraulic supply line 138. An upper feed line 140 is in hydraulic communication with the injection side chamber 95 and a lower feed line 142 is in hydraulic communication with the retraction side chamber 93. The servo valve controls the exact amount of pressure in each side thereby closely regulating the back pressure, injection pressure, material flow rate into the mold, and density of the material to significantly increase the quality and the consistency of injection molded parts. The back pressure is the pressure applied to the injection screw as it moves away from the mold while the injection cavity is filling.

Figures 9, 10:
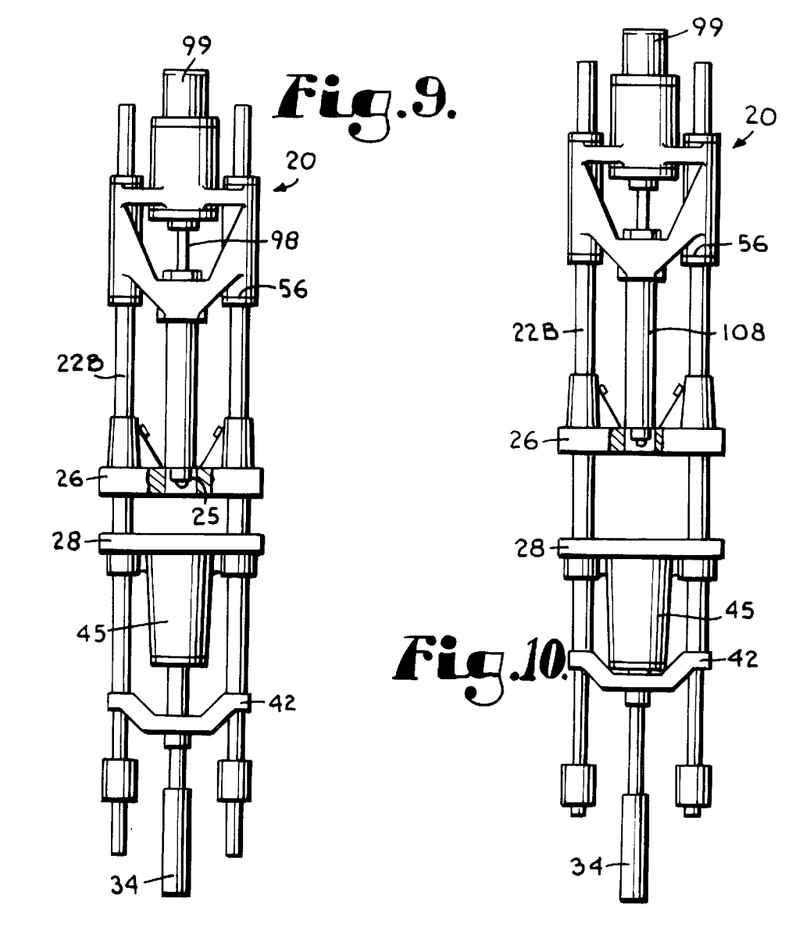
FIG. 9 is a front elevational view of the injection molding machine of FIG. 1 in an injection cylinder up position and having the mold assembly removed.
FIG. 10 is a front elevational view of the injection molding machine of FIG. 1 in a clamp open position and having the mold assembly removed.

Next, hydraulic pressure is applied in the retraction hydraulic chamber according to a preset timer in the control system preventing the material from leaving the nozzle when the mold is unclamped. Shortly thereafter, the high pressure is released and quick clamp cylinder is extended opening the clamp as shown in FIG. 10. The slide/lower mold half is then pushed from between the clamp plates, and ejector pins (not shown) eject the newly molded part from the lower mold half. The machine is now ready for the next injection cycle which begins with pulling of the mold between the clamp plates and closing the clamp.

Thus, an injection molding machine is disclosed which utilizes an integral injection cylinder and carriage cylinder housing to more efficiently obtain injection molded parts. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A carriage assembly for use in an injection molding machine which injects material into a mold, the carriage assembly comprising:

means for transporting the carriage assembly;

an injection cylinder assembly connected to the transporting means, and including a central internal chamber, a piston assembly, an outer cylindrical wall and an inner cylindrical sleeve;

the piston assembly being reciprocatingly received in the injection cylinder assembly, and including a rotating quill assembly rotatably received in the central internal camber of the injection cylinder assembly and an injection piston reciprocatingly held between the outer wall and the inner sleeve, and the inner sleeve, outer wall, and injection piston defining a hydraulic chamber;

an injection screw included in the rotating quill assembly;

a motor including a motor shaft connected to the rotating quill assembly to rotate the injection screw; and a control valve operative to control a pressure in the hydraulic chamber.

2. A carriage assembly for use in an injection molding machine which injects material into a mold, the carriage assembly comprising:

means for transporting the carriage assembly;

an injection cylinder assembly connected to the transporting means, and including a central internal chamber and a piston assembly;

the piston assembly being reciprocatingly received in the injection cylinder assembly, and including a rotating quill assembly rotatably received in the central internal camber of the injection cylinder assembly;

an injection screw included in the rotating quill assembly;

a motor including a motor shaft connected to the rotating quill assembly to rotate the injection screw; and wherein the rotating quill assembly further includes a roller spline rotatably connected to the motor and reciprocatingly received in the central inner chamber for substantially axial motion therein, and a spline-screw coupling collar connecting the injection screw to the roller spline.

3. The carriage assembly according to claim 2 wherein the piston assembly further includes an injection piston separated from the spline-screw coupling collar by thrust bearings.

4. A carriage assembly for use in an injection molding machine which injects material into a mold, the carriage assembly comprising:

means for transporting the carriage assembly;

an injection cylinder assembly connected to the transporting means, and including a central internal chamber and a piston assembly;

the piston assembly being reciprocatingly received in the injection cylinder assembly, and including a rotating quill assembly rotatably received in the central internal camber of the injection cylinder assembly;

an injection screw included in the rotating quill assembly;

a motor including a motor shaft connected to the rotating quill assembly to rotate the injection screw; and a barrel connected to the transport means, a barrel connected to and extending from the throat, the throat and barrel having the injection screw extending therethrough, and means for cooling the throat.

5. A carriage assembly for use in an injection molding machine which injects material into a mold, the carriage assembly comprising:

means for transporting the carriage assembly;

an injection cylinder assembly connected to the transporting means, and including a central internal chamber and a piston assembly;

the piston assembly being reciprocatingly received in the injection cylinder assembly, and including a rotating quill assembly rotatably received in the central internal camber of the injection cylinder assembly;

an injection screw included in the rotating quill assembly;

a motor including a motor shaft connected to the rotating quill assembly to rotate the injection screw;

a throat connected to the transporting means, a barrel extending from the throat and defining an injection cavity, a control valve;

and wherein the throat and barrel have the injection screw extending therethrough, the injection cylinder assembly further includes a hydraulic chamber, and the control valve operative to control a pressure in the hydraulic chamber thereby controlling an injection pressure, a back pressure, and a flow rate of the material in the injection cavity.

6. A carriage assembly for use in an injection molding machine which injects material into a mold, the carriage assembly comprising:

means for transporting the carriage assembly;

an injection cylinder assembly connected to the transporting means, and including a central internal chamber and a piston assembly;

the piston assembly being reciprocatingly received in the injection cylinder assembly, and including a rotating quill assembly rotatably received in the central internal camber of the injection cylinder assembly;

an injection screw included in the rotating quill assembly;

a motor including a motor shaft connected to the rotating quill assembly to rotate the injection screw;

a sensor array including a sensor mounted on the piston assembly, having a shot size control switch mounted on a component fixed relative to the piston assembly.

7. The carriage assembly according to claim 6 wherein the sensor array comprises a magnetic sensor array, and the switches are mounted on an integral housing.

8. An injection molding machine for molding a material into a desired shape, the machine comprising:

at least one transport rail;

an integral injection cylinder and carriage cylinder housing, including an injection cylinder wall and at least one carriage cylinder wall surrounding at least one transport rail;

an injection cylinder assembly connected to the injection cylinder wall;

a barrel including an internal injection cavity and a discharge end;

a motor;

a reciprocating rotary injection screw extending from the injection cylinder assembly into the barrel and driven by the motor;

a mold positioned at the discharge end of the barrel and including an internal mold cavity defining a shape to be molded; and a feed hopper in communication with the injection cavity of the barrel, a sensor array including a sensor mounted on a piston assembly having a shot size control switch mounted on a component fixed relative to the piston assembly, at least one lower stabilization bearing with the at least one transport rail extending therethrough, and at least one upper stabilization bearing with the at least one transport rail extending therethrough.

9. The machine according to claim 8 wherein the barrel comprises a heated barrel, the motor comprises a hydraulic motor, and the integral housing further includes a cooled throat holding the barrel.

* * * * *